United States Patent [19]
Anderson et al.

[11] Patent Number: 5,947,570
[45] Date of Patent: Sep. 7, 1999

[54] MODULAR CABINET ASSEMBLY FOR A COMPUTER

[75] Inventors: Neil A. Anderson, Rochester; Donald W. Dingfelder, Winona; Mark L. Kyllo, Kasson; John L. Colbert, Byron; Rodney G. Ratajczyk, Rochester, all of Minn.

[73] Assignee: International Business Machines Corporation, Armonk, N.Y.

[21] Appl. No.: 08/948,607

[22] Filed: Oct. 10, 1997

[51] Int. Cl.[6] .................................................. A47B 81/00
[52] U.S. Cl. .................................... 312/223.2; 312/265.5; 312/107; 361/724; D14/100; 211/26
[58] Field of Search ................................... 312/107, 108, 312/111, 257.1, 223.1, 223.2, 351.2, 265.1, 265.2, 265.6, 265.5; 211/26, 41.17; 361/724, 725, 730, 735; D14/100, 102

[56] References Cited

U.S. PATENT DOCUMENTS

| | | | |
|---|---|---|---|
| D. 366,648 | 1/1996 | Hill et al. ........................... | D14/100 |
| D. 377,478 | 1/1997 | Geck ................................. | D14/100 |
| 3,915,530 | 10/1975 | Anderson et al. ................ | 312/265.6 |
| 4,243,279 | 1/1981 | Ackeret ............................ | 312/107 |
| 4,699,270 | 10/1987 | Bohm ................................ | 312/107 |
| 5,138,525 | 8/1992 | Rodriguez ...................... | 361/724 X |
| 5,397,176 | 3/1995 | Allen et al. ..................... | 312/223.2 |
| 5,398,159 | 3/1995 | Andersson et al. ............. | 361/724 X |
| 5,447,367 | 9/1995 | Wei .................................. | 312/223.2 |
| 5,542,757 | 8/1996 | Chang ............................. | 312/223.2 |
| 5,593,219 | 1/1997 | Ho .................................. | 312/223.1 X |

*Primary Examiner*—Peter M. Cuomo
*Assistant Examiner*—James O. Hansen
*Attorney, Agent, or Firm*—Robert H. Berdo, Jr.

[57] ABSTRACT

An electrical cabinet includes at least one modular enclosure connectable to at least one of a further, substantially identical modular enclosure, and a pedestal enclosure. The modular enclosure has a generally parallelepiped shape, with at least one space therein for the placement of components. A cover is positionable over the exterior sides of the enclosure, and includes a modular rear cover section positionable over the rear side of the modular enclosure to essentially hide the rear side of the modular enclosure from view.

26 Claims, 17 Drawing Sheets

MODULAR CABINET ASSEMBLY FOR A COMPUTER

CROSS REFERENCE TO RELATED PATENT APPLICATION

The subject matter of this application is related to co-pending application Ser. No. 08/949,141, filed Oct. 10, 1997, entitled "ENHANCED COVER ARRANGEMENT FOR A COMPUTER" by Mark L. Kyllo, et al., attorney docket number RO-997-138-IBM-105.

BACKGROUND OF THE INVENTION

1. Field of the Invention

The invention relates to a modular cabinet assembly for a computer, for example, a deskside personal computer, and in particular, to a modular enclosure which can be connected to other modular enclosures to change the size of a computer housing, and modular covers which can be used to cover the modular enclosure or enclosures.

2. Background Information

Cabinets are housings which contain, for example, various components of a computer. Generally, computers having low computational abilities (hereinafter low power computers) require smaller housings (i.e., cabinets) than computers having high computational abilities (hereinafter high power computers). This is because high power computers have more and/or larger circuit boards, such as memory riser boards and processor boards, to handle their increased memory and computational needs. High power computers also have larger cooling systems to dissipate the heat generated by the components located on the circuit boards. More space is thus needed to hold these components.

Typically, to provide this additional space, a design engineer would design a new and larger housing based only on the current design needs. This results in housings specifically tailored for respective specific computers, without regard to the housings used for other existing computer systems.

However, as will be appreciated, this results in a housing that is relatively expensive both to design and manufacture. For example, new manufacturing procedures and new tooling arrangements may be required for the new housing. Further, storage requirements are complicated, since each type of housing must be stored separately prior to use. Therefore, a need exists for a single housing design that can be easily manufactured and modified for use with different computer systems having different internal space requirements.

Generally, a computer housing has both an underlying enclosure, such as a frame, that contains the various circuit boards and other components, and an aesthetically pleasing external cover that is superposed over the enclosure.

For example, when a small computer housing is needed, typically a small enclosure is designed and manufactured, together with a cover specifically adapted for covering the small enclosure.

The underlying enclosure is typically provided to protect the circuit boards from being damaged, and to provide orderly support for the circuit boards so that the circuit boards are properly positioned relative to each other. Since a particular enclosure is usually designed for a specific computer configuration, resulting in an efficient use of design and manufacturing resources, a need exists for an enclosure that can be used for different computer configurations.

Generally speaking, such enclosures are not aesthetically pleasing. For example, the enclosure may be provided with various air passages to allow for a cooling air to pass therethrough, to cool the electrical components located within the enclosure. These air passages are generally located without regard to the aesthetic appearance of the enclosure.

Further, the enclosure may be provided with one or more sub-enclosures, each of which houses specific components (such as circuit boards) of the computer. These components are often interconnected, or connected to other components of the computer, using ribbon cables that may extend out from one sub-enclosure and to another sub-enclosure. This likewise may be considered aesthetically displeasing.

In order to conceal the various inner workings of the computer, the enclosure is usually provided with a cover, which when installed, gives the computer a finished look. The cover may be given a decorative appearance, using various design configurations, as is known in the art. As such, the computer (with cover installed) can be used in home or office settings, with the over allowing the computer to blend in with the decor of the home or office.

Covers also provide a barrier between the internal electrical components of the computer and the user. The cover prevents the user from inadvertently coming in contact with a high-temperature or high-powered component located within the enclosure, thus protecting the user from accidental injury.

Further, covers help protect the components located within the enclosure from environmental damage, such as dust or liquid contamination. For example, should a user inadvertently spill a glass of water on the computer, the cover will provide a barrier that will help prevent the water from coming in contact with the internal components.

Additionally, covers provide sound barriers that help to muffle any noise generated by the components within the computer. For example, cooling blowers or fans are often used within the computer frame to cool the high-powered components located within the computer. These cooling blowers tend to generate a substantial amount of noise, which may be annoying to the user of the computer or to others working in the vicinity of the computer. The cover helps to contain this noise.

Typically, the enclosure is a rectangular box-shaped frame (i.e., a parallelepiped), with the cover usually covering at least a front of the fame, two opposing sides of the fame, and a top of the fame. This amount of coverage has generally been deemed sufficient to give the computer the desired finished look, while providing an adequate barrier (both acoustical and physical) between the computer components and the user. The rear and the bottom of the enclosure may or may not include a respective cover.

The cover typically has a plurality of panels arranged at right angles to one another. The panels may be permanently connected to one another to form a unitary structure that slides over and is fastened to the frame. Alternatively, the cover may include one or more separate panels, each of which is separately fastened to the frame. Covers that have separate panels are often used for covering large frames, since a large, unitary cover is difficult to manufacture, store, and transport.

Typically, the covers are designed and manufactured to be used with specific enclosures. Thus, if a large enclosure is to be used, a large cover is likewise designed and made for covering the large enclosure. Since each new cover configuration requires a retooling of the manufacturing equipment, as well as extensive design planning on the part of the design engineer, a need exists for a cover than can be enlarged or reduced in size to fit over and cover different sizes of enclosures.

SUMMARY OF THE INVENTION

It is, therefore, a principal object of this invention to provide a modular cabinet assembly for a computer.

It is another object of the invention to provide a modular cabinet assembly that solves the above mentioned problems.

These and other objects of the present invention are accomplished by the modular cabinet assembly disclosed herein.

According to one aspect of the invention, the modular cabinet includes a modular enclosure, which can be connected to other modular enclosures to change the configuration of the modular cabinet, and provide for a variety of housing arrangements. Generally, the enclosure is a parallelepiped, however, other configurations are also possible. However, by being a parallelepiped, the enclosure can advantageously be easily connected to one or more other modular enclosures, with a minimum of wasted space.

According to a further aspect of the invention, the enclosure may be, for example, a frame that has openings on opposite sides. With these openings in the enclosure, various components of the computer can be easily placed within the enclosure. Further, if two or more enclosures are connected together, with the openings in the sides of the respective enclosures advantageously in registration with one another, the connected enclosures will provide for a larger space for components than only one enclosure would provide.

According to another aspect of the present invention, if desired, the openings in the sides of the enclosures can be covered using separate panels. For example, the sides of the enclosures can be covered to seal the computer components within the enclosures. This advantageously provides extra protection for the components, and provides for a more rigid enclosure.

According to a further aspect of the invention, each enclosure may have structural members that spatially divided the enclosure into a plurality of spaces. For example, each enclosure can have a large space extending between a top and a bottom of the enclosure, and extending from a rear of the enclosure toward a front of the enclosure. The large space could be partitioned prior to reaching the front of the enclosure, for example, to provide one or more further spaces in the front of the enclosure. This advantageously provides for a plurality of discrete locations in which separate computer components can be located. For example, the large space can accommodate a central electronics complex, which may include, for instance, a sub-enclosure that contains a backplane, and a clock card, at least one memory riser card, and at least one processor card attached to the backplane. On the other hand, the further space or spaces in the front of the enclosure could contain, for example, a hard drive, floppy drive units, or other peripheral components of the computer. By providing separate spaces for the various components, the components can advantageously be positioned according to the respective component's cooling requirements, for example.

According to another aspect of the invention, the cabinet includes an external cover having at least one section. The cover section is arranged over a respective side of the enclosure, and will hide the side of the enclosure from view regardless of how many enclosures are connected together. Preferably, the cover section includes at least a modular rear cover section. The rear cover section may include various modular sub-components which can be connected together in different configurations. This reduces the number of rear cover components necessary to cover a rear of the various housing arrangements, for example, when the enclosure is stacked on a pedestal, or when the enclosure is used singularly.

According to a further aspect of the invention, a method of changing a configuration of an electronics cabinet is provided, in which a modular cabinet is adapted to be used both singularly, connected adjacent to a further, substantially identical modular enclosure, and/or connected on top of a pedestal enclosure. The method advantageously allows for the configuration of the electronics cabinet to be changed by using the modular enclosure singularly, connecting the modular enclosure to a substantially identical modular enclosure, and/or connecting the modular enclosure on top of a pedestal.

DETAILED DESCRIPTION OF THE PREFERRED EMBODIMENTS

The invention will now be described in more detail by way of example with reference to the embodiments shown in the accompanying figures. The following described embodiments are only presented by way of example and should not be construed as limiting the inventive concept to any particular physical configuration.

The present invention is directed to a modular cabinet. The modular cabinet is used as a housing for various components, for example, the components of a computer. However, the cabinet can also be used to house the components of other electrical systems, within the spirit of the invention.

The term modular, as used herein, indicates that the cabinet (or its sub-components) is constructed with one or more standardized components having standardized dimensions.

Figure 1:
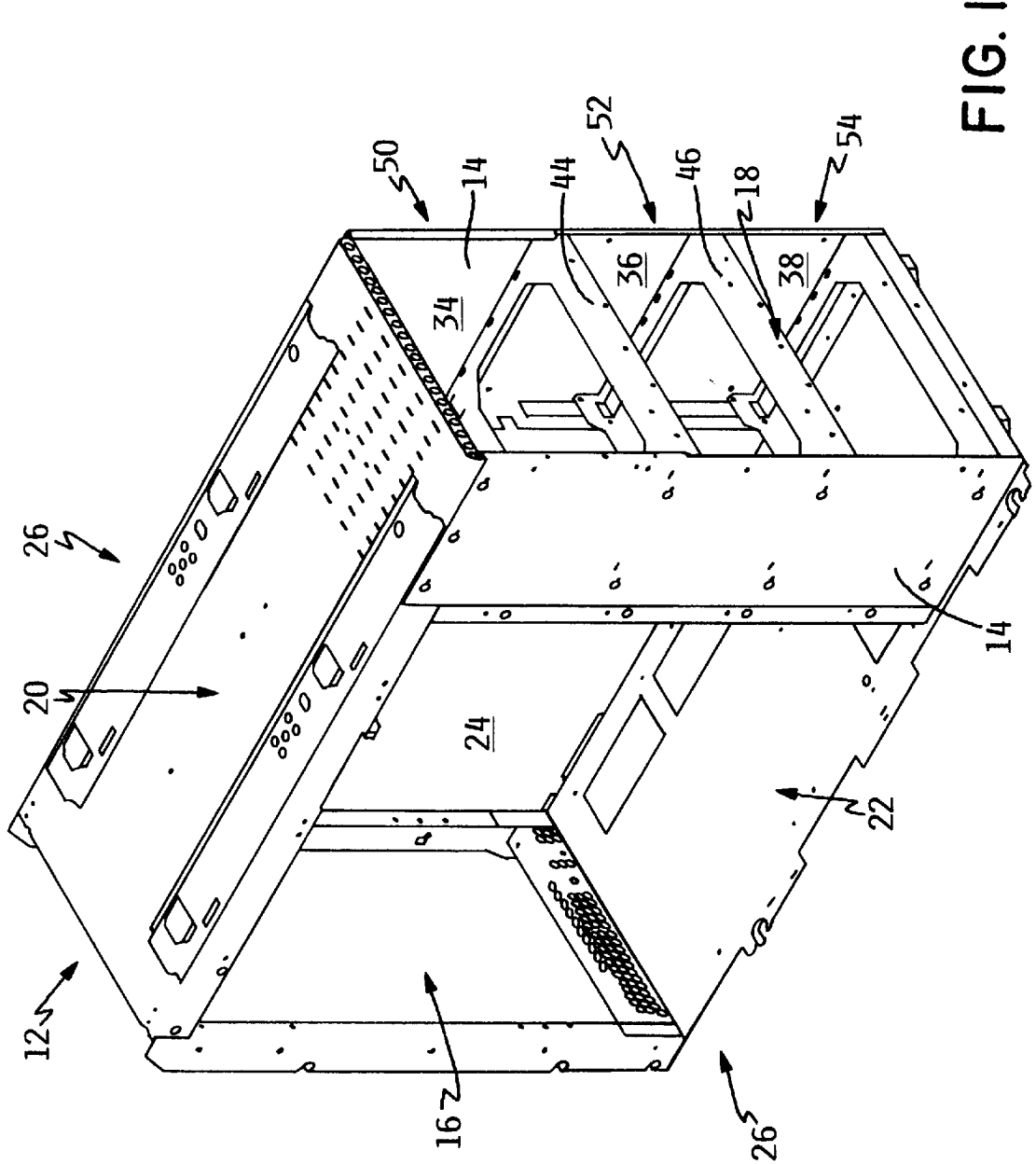
FIG. 1 is a front perspective view of an enclosure according to an exemplary embodiment of the invention.
Figure 2:
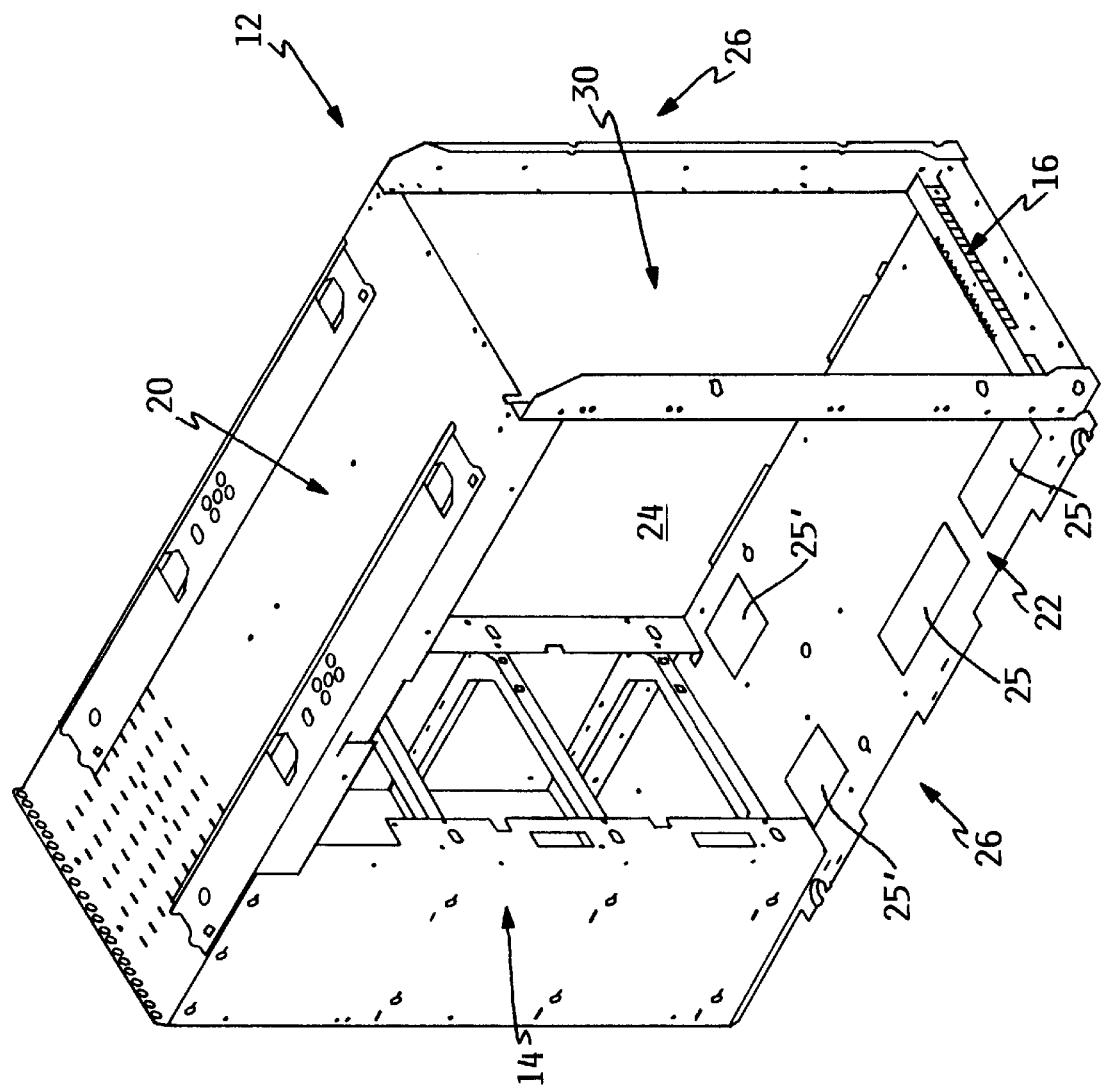
FIG. 2 is a rear perspective view of the enclosure shown in FIG. 1.

The modular cabinet includes at least one modular enclosure 12, as shown in FIGS. 1 and 2, which may be, for example, a frame, i.e., a structure that gives strength and shape to the modular cabinet. Generally, the modular enclosure 12 is a parallelepiped, however, other configurations are also possible within the spirit of the invention.

Preferably, the modular enclosure 12 has two oppositely located major sides 14, which extend parallel to the sides of the modular cabinet (not shown), and a rear side 16, a front side 18, a top side 20 and a base side 22 arranged perpendicular to the major sides 14. The top side 20 and the base side 22 extend generally parallel to each other, have generally the same dimensions, and have a length that is about equal to a length of the major sides 14. Likewise, the front side 18 and the rear side 16 extend generally parallel to each other, have generally the same dimensions, and have a height that is about equal to a height of the major sides 14. The major sides 14, rear side 16, front side 18, top side 20 and base side 22 are all connected together to form the parallelepiped, and surround at least one space 24 within the modular enclosure 12 for locating various components.

The base side 22 may be provided with one or more openings 25, 25', which allow for the passage of, for example, electrical cables from an exterior of the enclosure 12 into the space 24. For example, the enclosure 12 may be disposed on top of a pedestal (not shown in this Figure) that contains, for instance, the power supply for the computer. The power supply can be connected to electrical components disposed within the enclosure 12 by passing a power cable up through openings 25, 25'. When not needed, openings 25, 25' may be covered with a plate (not shown).

The modular enclosure 12 may have a large opening 26 located in each respective major side 14 of the modular enclosure 12 to allow access to the space 24 within the modular enclosure 12. The large openings 26 allow components to be easily placed and located within the modular enclosure 12. As shown, the large openings 26 are approximately square in shape, and extend roughly from the top side 20 of the modular enclosure 12 to the base side 22, and from the rear side 16 of the modular enclosure 12 toward the front side 18 of the modular enclosure 12. As shown, the large openings 26 do not extend all the way up to the front side 18 of the modular enclosure 12, but instead are set back a distance, for example, one-third of the length of the modular enclosure 12, away from the front side 18 of the modular enclosure 12. Of course, other shapes and configurations of the large openings 26 are also possible within the spirit of the invention.

Figure 3:
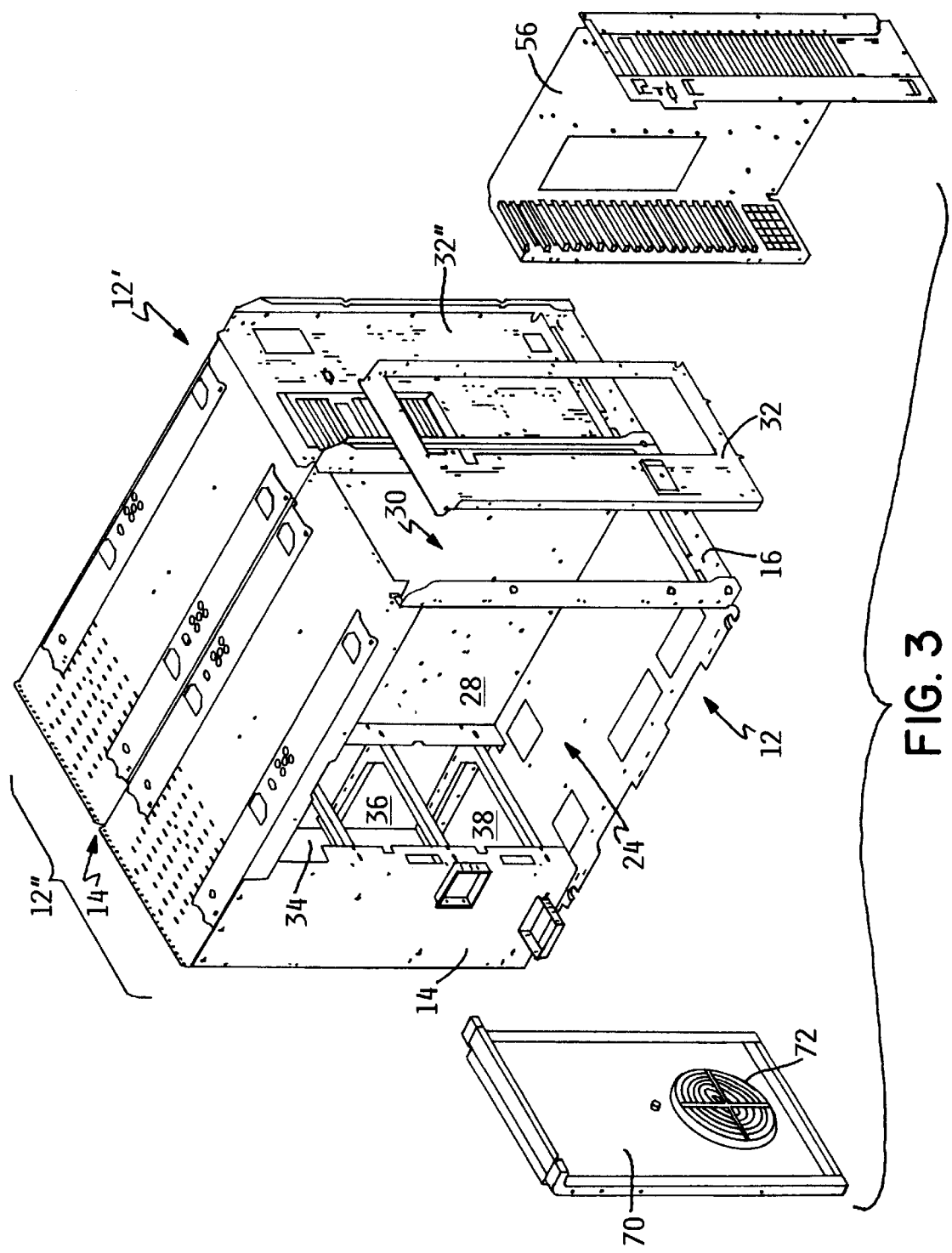
FIG. 3 is a rear perspective view of two of the enclosures shown in FIGS. 1 and 2 connected together, according to an exemplary embodiment of the invention, together with various components which may be located within the enclosures.

Referring also to FIG. 3, the configuration of the modular enclosure 12 allows the modular enclosure 12 to be placed adjacent to (or on top of) and flush against another, substantially identical modular enclosure 12', to form a larger modular enclosure 12". In the following description, where reference is made to only one of the modular enclosures 12, 12', it is to be understood that the other modular enclosure may have a similar configuration, with reference to the corresponding feature being omitted for the sake of brevity.

According to this exemplary embodiment, when the first modular enclosure 12 is not large enough to house the components of, for example, a high power computer, the second modular enclosure 12' can be placed adjacent to the first modular enclosure 12, with the respective major sides 14 positioned against and connected to each other, and with the respective large openings 26 in registration with one another. Thus, the connected modular enclosures will provide for a larger internal space (not shown) for components than would only one modular enclosure 12.

The modular enclosures 12, 12' can be connected to each other using screws or other fastening devices, such as welds or clips (not shown). For example, screws can be inserted through the major sides 14 and around a periphery of the large openings 26 to fasten the modular enclosures 12, 12' together. Other fastening configurations are also possible within the spirit of the invention.

Figure 4:
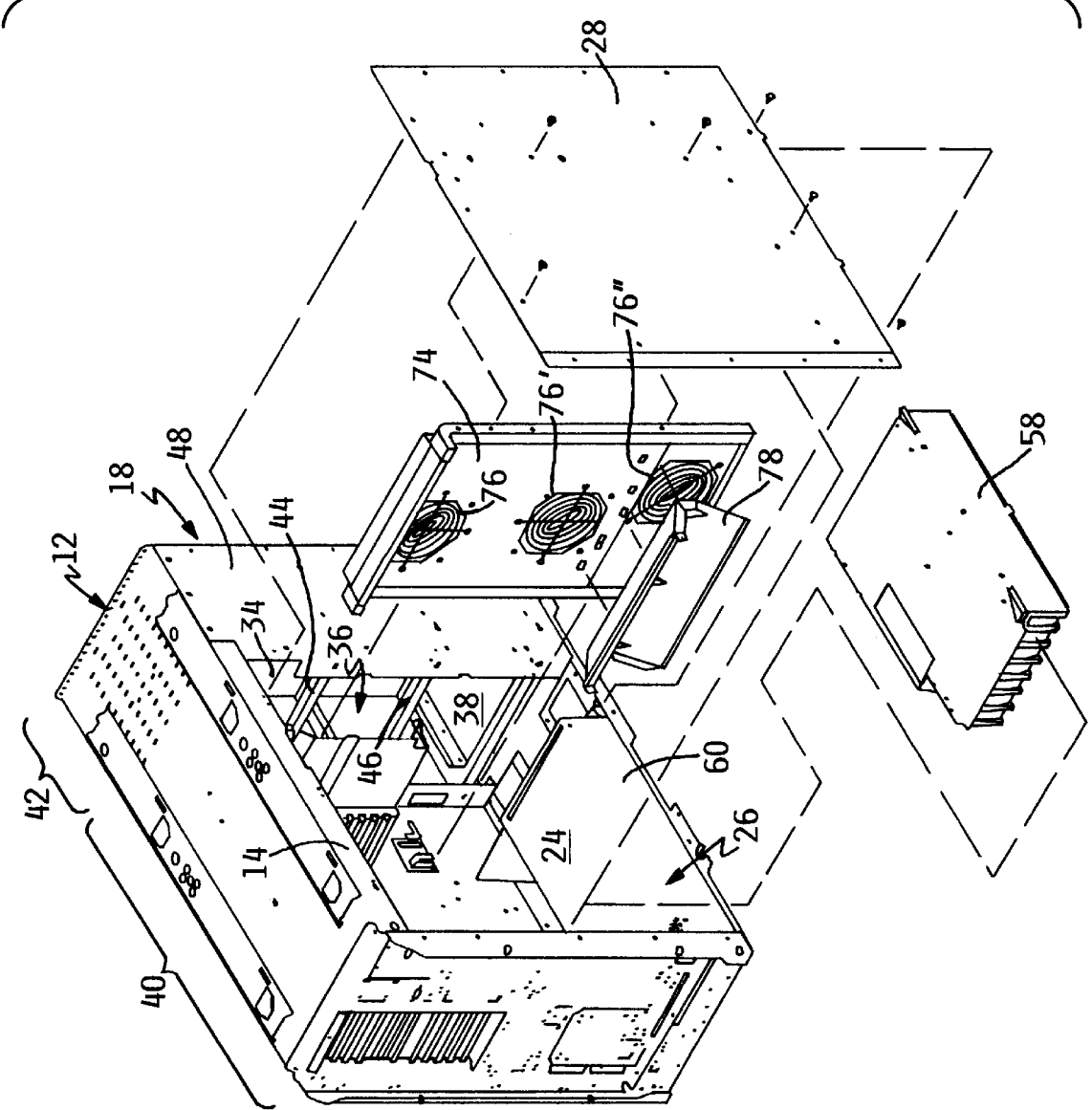
FIG. 4 is a rear perspective view of the enclosure shown in FIGS. 1 and 2, together with various components which may be located within the enclosures, and a cover panel used to cover an opening in the enclosure, according to an exemplary embodiment of the invention.

As best shown in FIG. 4, the large openings 26 in the major sides 14 of the modular enclosures 12 can be covered using separate panels 28. For example, the openings 26 in major sides 14 of the modular enclosure 12 can be covered to seal the computer components (not shown) within the modular enclosure 12. The panels 28 advantageously provide protection for the components, and provide for a more rigid modular enclosure 12. Further, if the openings 26 located in the adjacent major sides 14 of the modular enclosures 12, 12' are covered, such as shown in FIG. 3, instead of one double-large space being formed in the interior of the interconnected modular enclosures 12", two separated large spaces are formed, i.e., one in each enclosure 12, 12' separated by panel 28. This configuration may be advantageous when the components located within one large space 24 need to be separated from the components located within the other large space, for example, due to the cooling requirements of the components. Further, the electrical components within one of the enclosures may operate at a frequency that interferes with the operation of electrical components located within the other enclosure. Panel 28 can provide for EMC (electromagnetic compatible) protection, if the panel 28 is comprised, for example, of metal.

Figure 5:
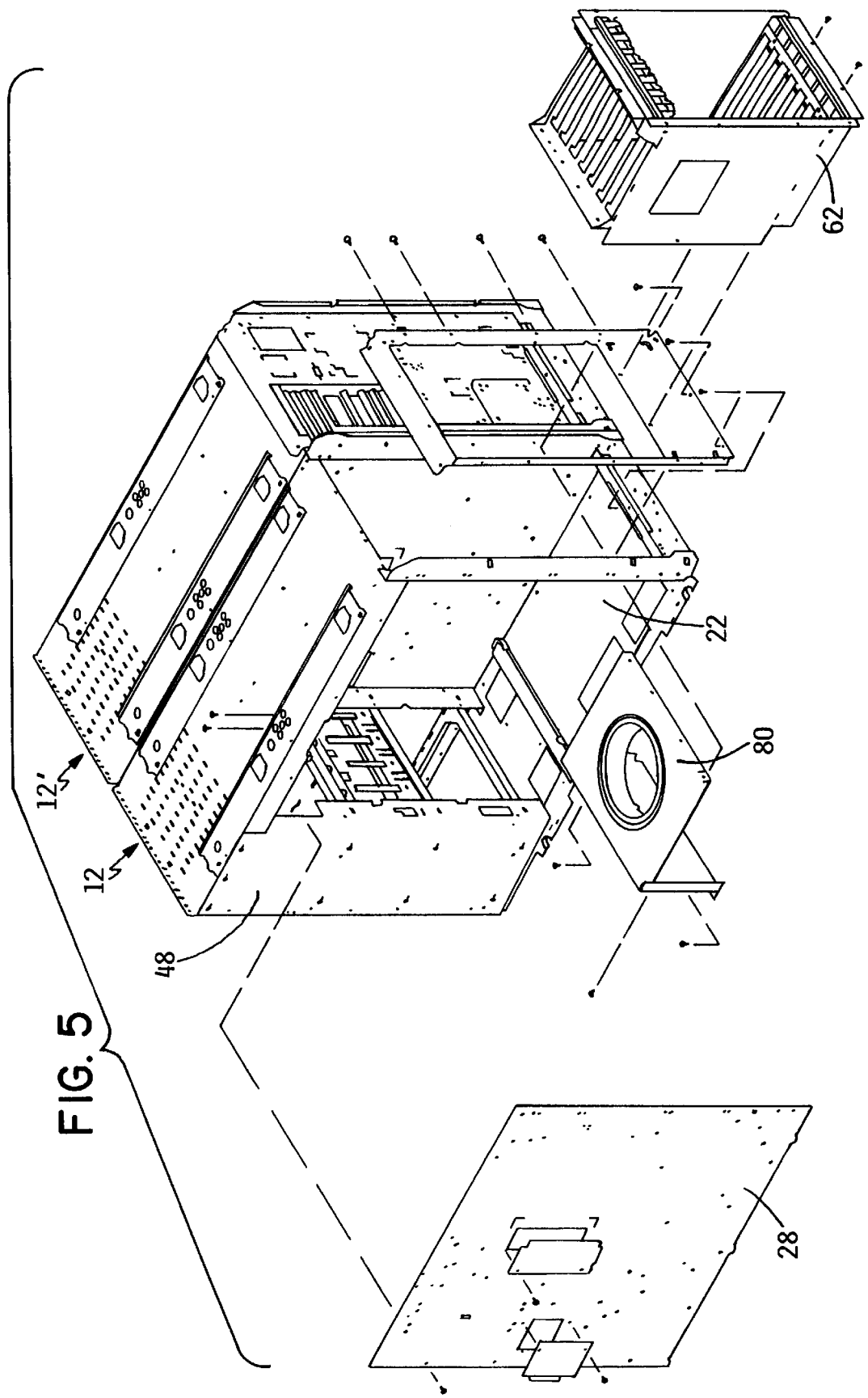
FIG. 5 is a rear perspective view of two of the enclosures shown in FIGS. 1 and 2 connected together, similar to the arrangement shown in FIG. 3, but with different components located within the enclosures, according to an exemplary embodiment of the invention.

Referring back to FIG. 3, the rear side 16 of the modular enclosure 12 may likewise have an opening 30 therein, to allow various components to be positioned within the space 24, and to allow for access of the various components through the rear side 16. Further, a rear side enclosure panel 32 may be provided, such as shown in FIGS. 3, 4 and 5, to cover the opening 30 in the rear side 16. The rear side enclosure panel 32 may be specifically adapted to correspond to the components within the modular enclosure 12. For example, as shown in FIG. 3, the rear side enclosure panel 32 attached to the modular enclosure 12 has a different configuration than the rear side enclosure panel 32' attached to the modular enclosure 12'. Other configurations of the rear side enclosure panel 32 are possible within the spirit of the invention.

In addition to the space 24, which is relatively large, each modular enclosure 12, 12' may be spatially divided into a plurality of smaller spaces 34, 36, 38. For example, and as best shown in FIG. 4, the modular enclosure 12 can include one or more structural members that form a partition, so that the large space 24 is located in a rear region 40 of the modular enclosure 12, and the small spaces 34, 36, 38 are located in a front region 42 of the modular enclosure 12.

Preferably, the small spaces 34, 36, 38 can be accessed through the front side 18 of the modular enclosure 12, and are separated from one another by the structural members, such as shelves 44, 46. The sides of the small spaces 34, 36, 38 can be permanently covered by a panel 48 that is an integral part of the modular enclosure 12, and covers the portion of the major sides 14 up to the large opening 26, i.e., in the front region 42. Each shelf 44, 46 is fastened to the panels 48, for example, by welding, so that the shelves 44, 46 are fixed and rigid.

Figure 6:
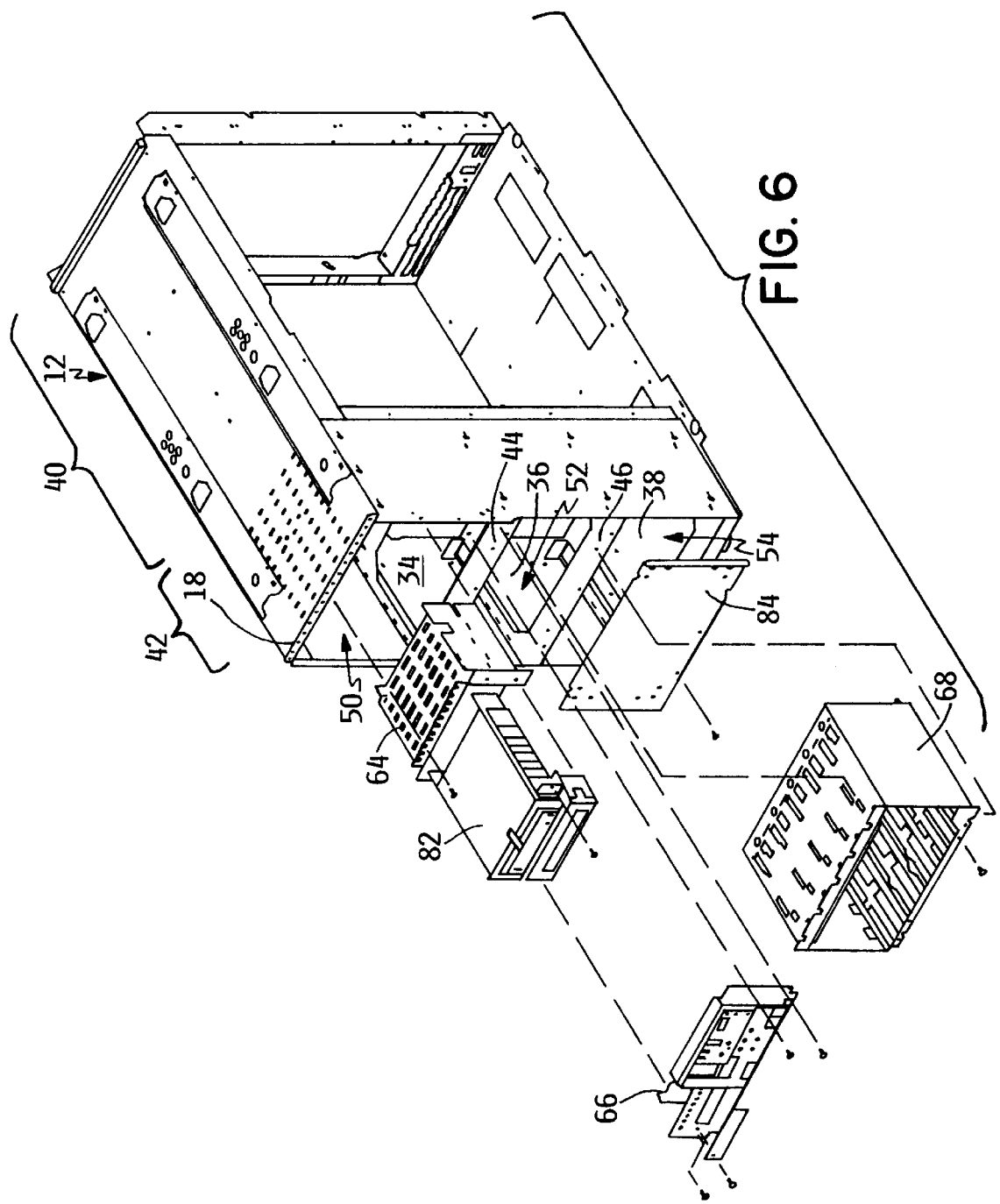
FIG. 6 is a front perspective view of the enclosure shown in FIGS. 1 and 2, together with various components which may be located within a front region of the enclosure, according to an exemplary embodiment of the invention.

Referring briefly to FIGS. 1 and 6, each small space 34, 36, 38 may be accessed through an opening 50, 52, 54 formed in the front side 18 of the modular enclosure 12 for the installation or removal of selected components. In this embodiment, the modular enclosure 12 has three small openings 50, 52, 54, arranged stacked on top of each other and in registration with the respective small spaces 34, 36, 38. Of course, other arrangements of the openings and spaces are possible, without departing from the spirit of the invention.

The spaces 24, 34, 36, 38 provide for a plurality of discrete locations in which separate computer components can be located. For example, the large space 24 can accommodate a central electronics complex (not shown), which may include, for example, a sub-modular enclosure that contains a backplane, and a clock card, at least one memory riser card, and at least one processor card attached to the backplane. Alternatively, the large space 24 can contain a peripheral component interconnect (PCI) cage 56 (FIG. 3), a processor card cage 58 (FIG. 4), a power supply cage 60 (FIG. 4), and/or a processor book cage 62 (FIG. 5). On the other hand, and as shown in FIG. 6, the small spaces 34, 36, 38 in the front region 42 of the modular enclosure 12 could contain, for example, a hard drive (not shown), tape unit cage 64, an operator panel 66, a direct access storage device (DASD) cage 68, or other peripheral components of the computer. By providing separate spaces for the various components, the components can advantageously be positioned according to the respective component's cooling requirements, for example.

As best shown in FIGS. 3–5, the aforementioned cages 56, 58, 60, 62 receive various components (not shown) for placement within large opening 26. The cages 56, 58, 60, 62 correctly position the components within the modular enclosure 12, and provide the components with added protection against environmental and accidental damages. Further, the cages 56, 58, 60, 62 may provide for a specific cooling arrangement that ensures the components located within the modular enclosure 12 are adequately cooled. For example, and as shown in FIG. 3, a fan panel 70 containing a single fan 72 can be positioned between the large space 24 and the small spaces 34, 36, 38, for causing a flow of cooling air to pass by the PCI cage 56, to cool the high powered components therein.

Alternatively, and as shown in FIG. 4, a fan panel 74 containing three fans 76, 76', 76" may be positioned between the large space 24 and the three small spaces 34, 36, 38. An air panel 78 may be positioned adjacent to the fan panel 74, to direct a flow of cooling air to, for example, the processor card cage 58. The flow of cooling air passes through the processor card cage 58, transferring the heat generated by the processor cards therein (not shown) out of the modular enclosure 12.

Alternatively, and as shown in FIG. 5, a fan plate 80 can be positioned on the inside surface of the base side 22 of the modular enclosure 12, with, for example, the processor book cage 62 positioned over the fan (not shown). Other arrangements of the components are likewise possible, within the spirit of the invention.

Likewise, and as best shown in FIG. 6, the various components locatable within the small spaces 34, 36, 38 can be positioned within cages 64, 68, which are specifically adapted to fit into the small spaces 34, 36, 38, and specifically configured to receive a selected component. For example, tape unit cage 64 can be configured to fit into the uppermost small opening 34, for example, and can receive tape unit 82 therein. Further, the DASD cage 68 is specifically configured to receive one or more storage devices (not shown). The various cages thus serve as adapters, allowing components to be securely positioned within the modular enclosure 12 regardless of the configuration of the component. Of course, the present invention is not limited to these components, nor their recited positioning within the modular enclosure 12. Other arrangements and configurations are also possible, without departing from the spirit of the invention.

As shown in FIG. 6, the small spaces 34, 36, 38 can be provided with one or more covers 84 to seal off any unused small spaces, or to seal off small spaces having components which do not require user access. The cover 84 can be attached to the modular enclosure 12 in any known manner, for example, by using screws.

Figure 7:
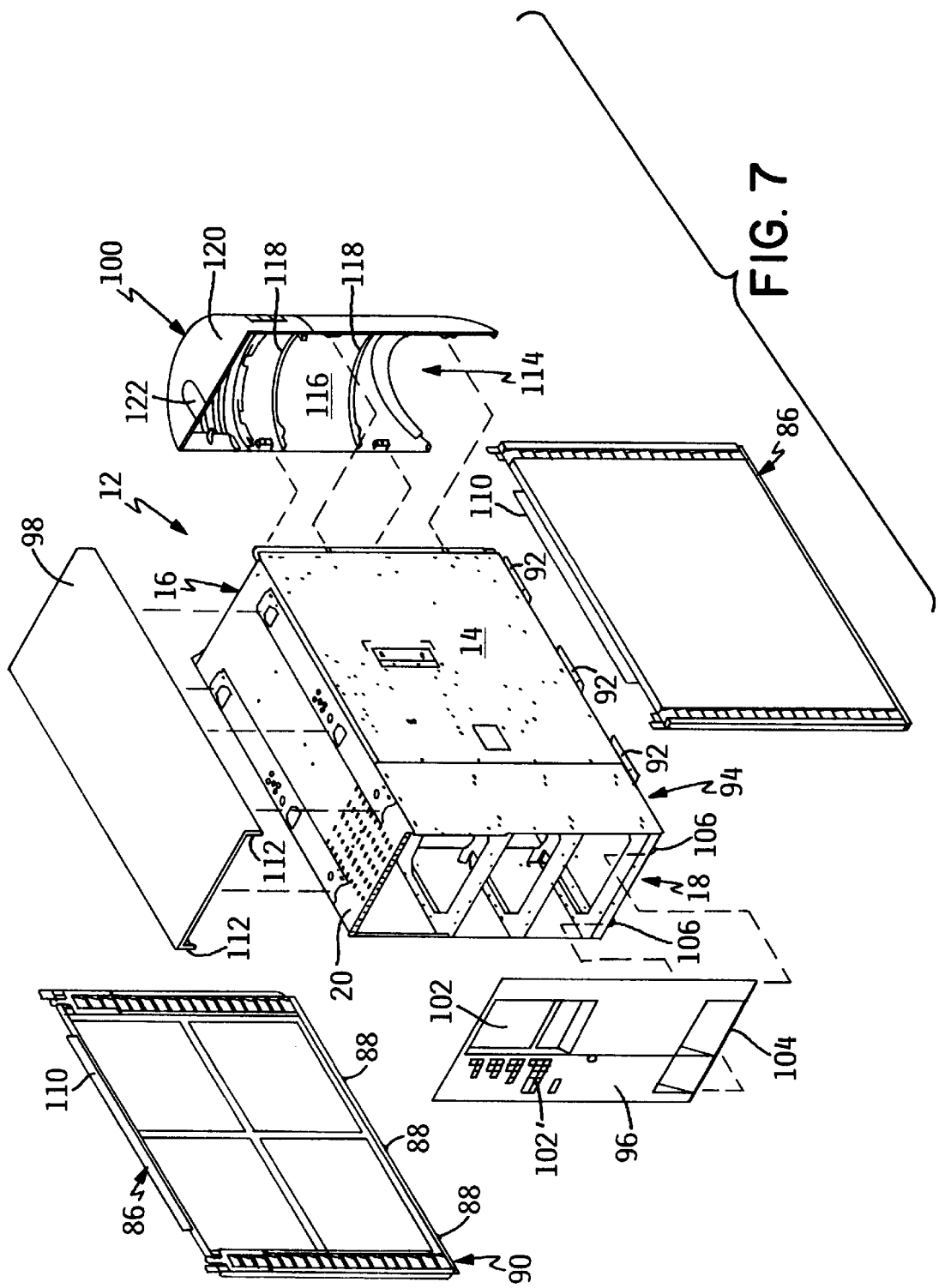
FIG. 7 is a front perspective view of the enclosure shown in FIGS. 1 and 2, together with various cover segments used to cover the enclosure, according to an exemplary embodiment of the invention.

As shown in FIG. 7, the modular cabinet further includes an exterior cover positioned over the modular enclosure 12, to hide the modular enclosure 12 from view. The cover includes a plurality of cover sections, each specifically adapted to cover either the major sides 14, rear side 16, front side 18, or top side 20 of the modular enclosure 12.

The cover sections for the major sides 14 of the modular enclosure 12 can be, for example, side panels 86. Each side panel 86 is arranged over a respective outermost major side 14 of the modular enclosure 12, to cover the major sides 14 of the modular enclosure 12 from view regardless of how many modular enclosures are connected together. This advantageously provides for a cover component that can be used on a variety of housing configurations.

The side panel 86 is typically essentially planar and rectangular in shape, although other configurations may be possible. Generally, the side panel 86 has a shape that corresponds to the shape of the major side 14 of the underlying modular enclosure 12, so that when installed, the major side 14 of the modular enclosure 12 is essentially completely covered by the side panel 86. In this exemplary embodiment, each side panel 86 is about 24 inches in height by about 31 inches in width.

As shown in FIG. 7, the side panel 86 may be provided with alignment tabs 88 along its base edge 90, which engage with recesses 92 formed along the bottom edge 94 of the major side 14 of the modular enclosure 12, to correctly position the side panel 86 relative to the modular enclosure 12. When placing the side panels 86 on the modular enclosure 12, each side panel 86 is placed adjacent to a respective outermost major side 14 of the modular enclosure 12, with the alignment tabs 88 in engagement with the respective recesses 92. Once in position, the side panels 86 can be secured to the modular enclosure 12 using, for example, screw fasteners. However, the present invention is not limited to such fastening devices, and the side panels 86 can be secured to the modular enclosure 12 in any of a variety of ways, without departing from the spirit of the invention.

The cover according to the present invention may also include a front cover section 96, a top cover section 98 and a rear cover section 100 for covering the front side 18, top side 20 and rear side 16 of the modular enclosure 12, respectively.

The front cover section 96 may include various openings 102, 102', etc., therein for allowing access to, for example, the tape unit 82 and/or the operator panel 66 positioned within the small spaces 34, 36, 38. As shown, the front cover section 96 likewise has a shape which corresponds to a shape of the front side 18 of the modular enclosure 12, so that when installed, the front side 18 of the modular enclosure 12 is essentially hidden from view by the front cover section 96.

The front cover section 96 may be provided with recesses (not shown) along its base edge 104, which engage with alignment tabs 106 formed at the base of the front side 18 of the modular enclosure 12. The alignment tabs 106 engage with the recesses to correctly position the front cover section 96 relative to the modular enclosure 12. Once in position, the front cover section 96 can be secured to the modular enclosure 12 and/or the side panel 86 in a variety of ways, for example, by using a latching arrangement (not shown) or other means.

The top cover section 98 is positionable over the top side 20 of the modular enclosure 12, and has a shape that generally corresponds to the shape of the top side 20 of the modular enclosure 12. In order to help secure the side panels 86 to the modular enclosure 12, each side panel 86 may be provided with a flange 110 that extends along the upper edge of the respective side panel 86. The top cover section 98 would then likewise be provided with two parallel lips 112, arranged along opposite edges of the top cover section 98, and which overlap the flanges 110 when the top cover section 98 is installed, thus holding the side panels 86 against the enclosure 12.

Although in the illustrated embodiments, the side panels 86, front cover section 96 and top cover section 98 are shown as being essentially planar components, they are not limited to such a configuration. For example, the side panels 86, front cover section 96 and top cover section 98 could also have, for example, a curvilinear shape, or other configurations, without departing from the spirit of the invention.

Figure 8:
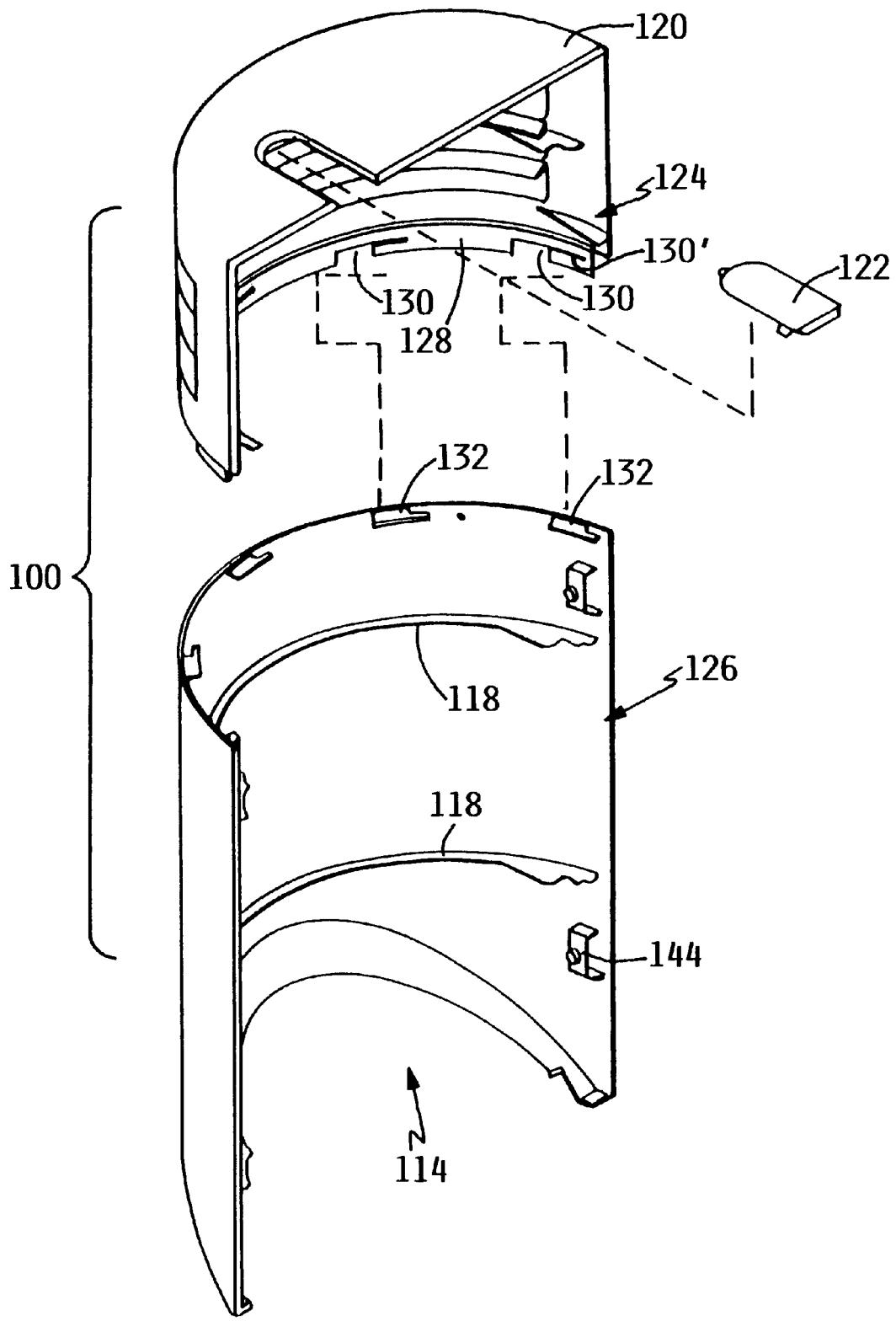
FIG. 8 is an exploded perspective view of the rear cover segment shown in FIG. 7, illustrating the sub-components of the rear cover section, according to an exemplary embodiment of the invention.
Figure 9:
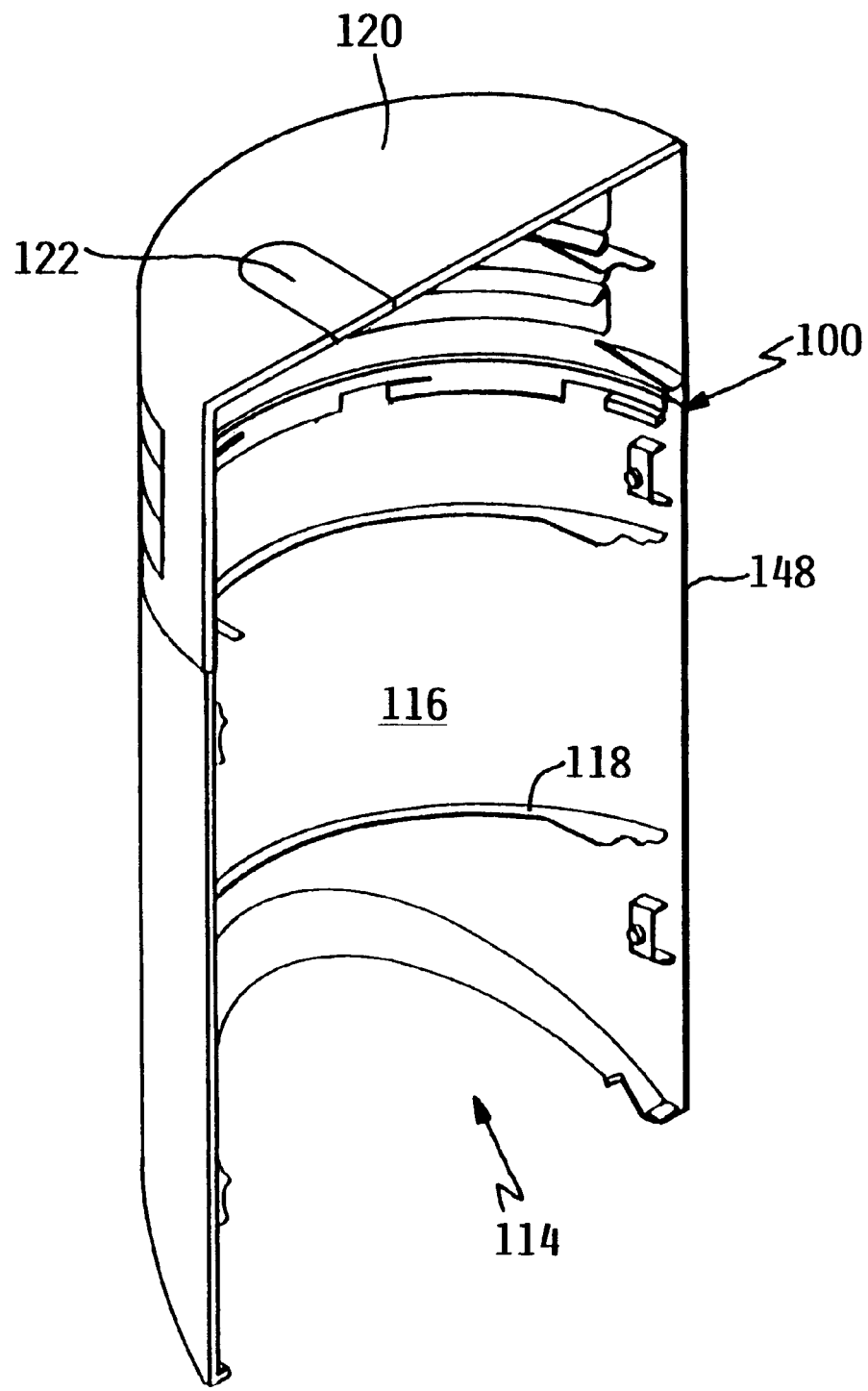
FIG. 9 is a perspective illustration of the rear cover segment shown in FIG. 7, with the sub-components positioned together.

The rear cover section 100 is positionable over the rear side 16 of the modular enclosure 12, and has a height and a width which essentially corresponds to the height and width of the rear side 16 of the modular enclosure 12. The rear cover section 100 could have a configuration similar to the front cover section 96, and interact with the side panels 86 in a manner similar to the front cover section 96. Alternatively, the rear cover section 100 can have a different configuration than the front cover section 96 and/or attach to the modular enclosure 12 in a different manner than front cover section 96. For example, and referring to FIGS. 7–9, the rear cover section 100 is shown as having generally a hollow half tube shape, and is open at its base 114. As such, when installed over the rear side 16 of the modular enclosure 12, a space is formed between the rear side 16 of the modular enclosure 12, and an inside surface 116 of the rear cover section 100. Thus, for example, power cables (not shown) can be brought to the rear of the modular enclosure 12 up through the base 114 and through this space, without detracting from the aesthetic appearance of the arrangement. The open base 114 also allows for a sufficient flow of cooling air to reach the components located within the modular enclosure 12.

As shown, the rear cover section 100 may be provided with one or more horizontally extending ribs 118 on its inside surface 116. The ribs 118 provide added rigidity and strength to the rear cover section 100. Further, when the rear cover section 100 is located over the rear side 16 of the modular enclosure 12, the ends of the ribs 118 abut against the rear side 16, and serve as positioning stops, to correctly position the rear cover section 100 relative to the rear side 16 of the modular enclosure 12.

The rear cover section 100 also may include a generally planar, horizontal semicircular section 120 at a top of the rear cover section 100. When the rear cover section 100 is installed, the semicircular section 120 and the top cover section 98 appear as a continuous planar section, lending to the pleasing aesthetic appearance of the cover.

The semicircular section 120 may include a removable panel 122, which when removed, would allow for the passage of, for example, a cable (not shown) into the space formed between the rear side 16 of the modular enclosure 12 and the inside surface 116 of the rear cover section 100. For example, if a stand-alone peripheral component, such as a modem, was located outside of the modular cabinet, it could be connected to related electrical components within the modular enclosure 12 by passing its cable down through the removable panel 122, and into the space formed between the rear side 16 of the modular enclosure 12 and the inside surface 116 of the rear cover section 100.

Preferably, and referring to FIGS. 8 through 11, the rear cover section 100 is modular in nature. In particular, the rear cover section 100 may be subdivided into two or more stackable sub-components, which when added together, will change the height of the rear cover section 100, while giving the appearance of one unitary section. For example, in FIGS. 8 and 9, the rear cover section 100 is comprised of a first section and second section, such as a top section 124, and a bottom section 126 connectable to the top section 124. Both the top section 124 and the bottom section 126 have half-tubular shapes, so that when connected together, the rear cover section 100 has the desired hollow half tube shape. Further, the top section 124 includes the semicircular section 120 at its upper end, and a downwardly projecting, horizontally extending flange 128 at its lower end. The downwardly projecting flange 128 is arc-shaped, and includes one or more recesses 130 therein. Each recess 130 is in communication with a horizontally-extending slot 130'. The bottom section 126 includes at least one engagement finger 132 projecting out from the inner surface of the bottom section 126, and in registration with a respective recess 130 in the flange 128. Each engagement finger 132 is engageable with a respective slot 130' via a respective recess 130 to hold the top section 124 and bottom section 126 together, thus forming the rear cover section 100.

Figure 10:
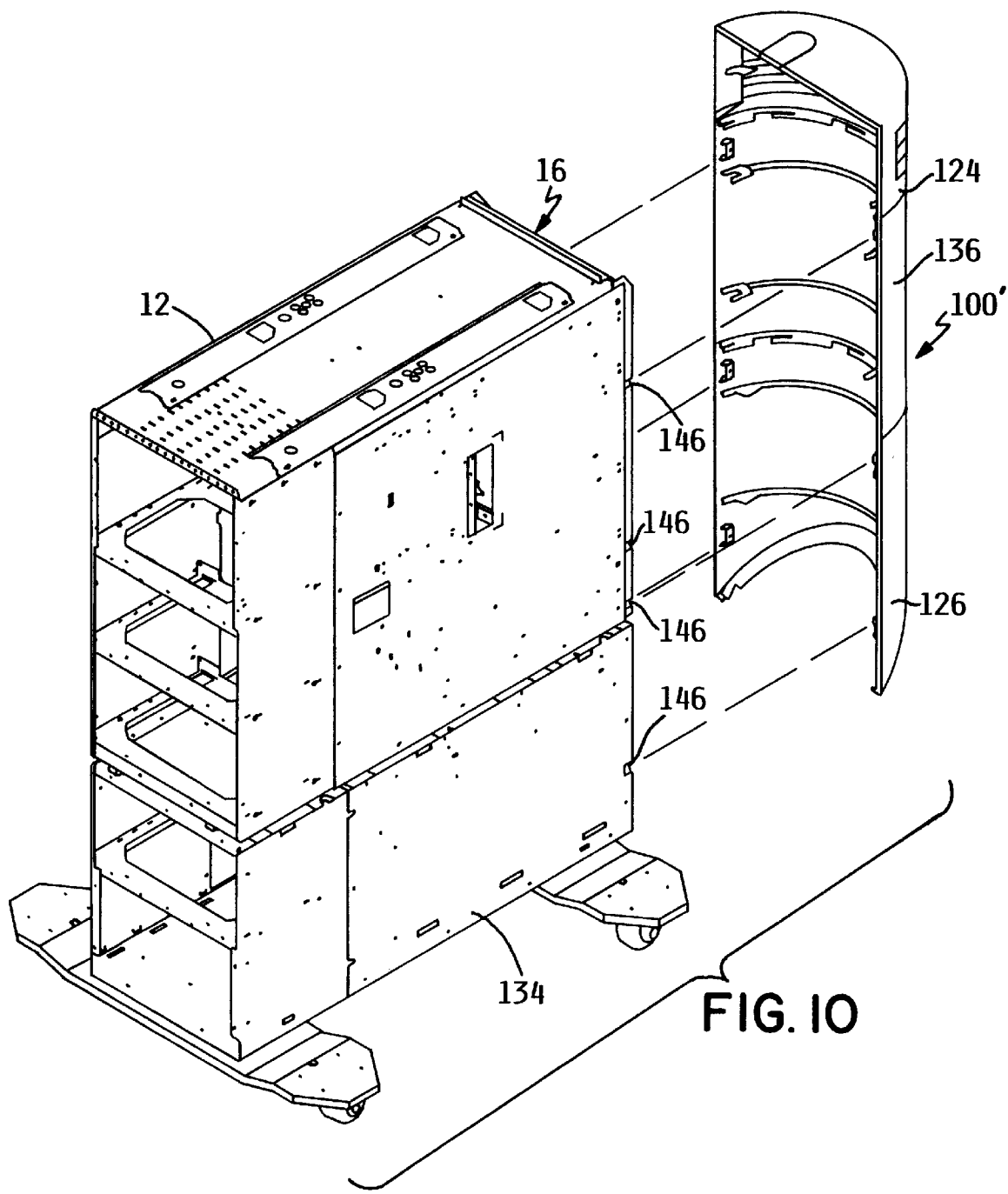
FIG. 10 is a perspective, exploded view of the enclosure shown in FIGS. 1 and 2 arranged on top of a pedestal, together with an exemplary alternative embodiment of the rear cover section shown in FIGS. 7–9.
Figure 11:
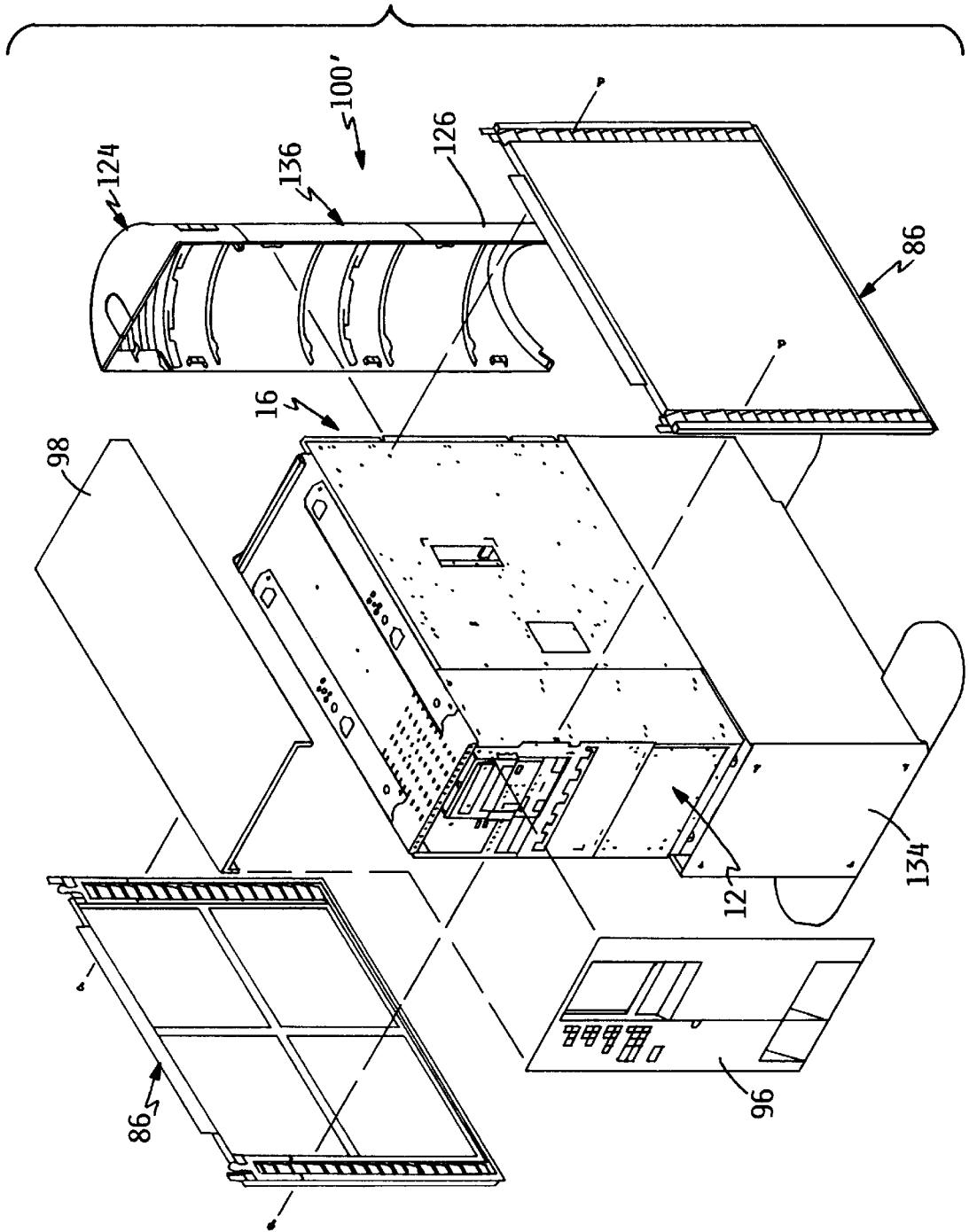
FIG. 11 is a perspective, exploded view of the enclosure arrangement shown in FIG. 10, but with various other cover sections positioned around the respective sides of the enclosure, according to an exemplary embodiment of the invention.

In this embodiment, the rear cover section 100 is suitable for covering the rear of one modular enclosure 12. However, it may be desirable to arrange the modular enclosure 12 on top of a base or pedestal 134, such as shown in FIGS. 10 and 11. The pedestal 134 may be hollow, and used as a further enclosure, for example, to house the power supply (not shown) of the computer, as was previously described with reference to FIG. 2. However, instead of passing the power cable through openings 25, 25' as previously described, the power supply could be interconnected to the components of the computer using a cable (not shown) that extends from the power supply, out through a back of the pedestal 134, and into the modular enclosure 12 through the rear side 16 of the modular enclosure 12. Since it may be desirable to cover the cable in a region of the pedestal 134, an intermediate section 136 can be provided to form a rear cover section 100' having an increased length, so that when installed, the rear cover section 100' covers both the rear side 16 of the modular enclosure 12, and the back of the pedestal 134. The other sides of the pedestal 134 may be covered in any known manner, such as shown in FIG. 11.

Figure 12:
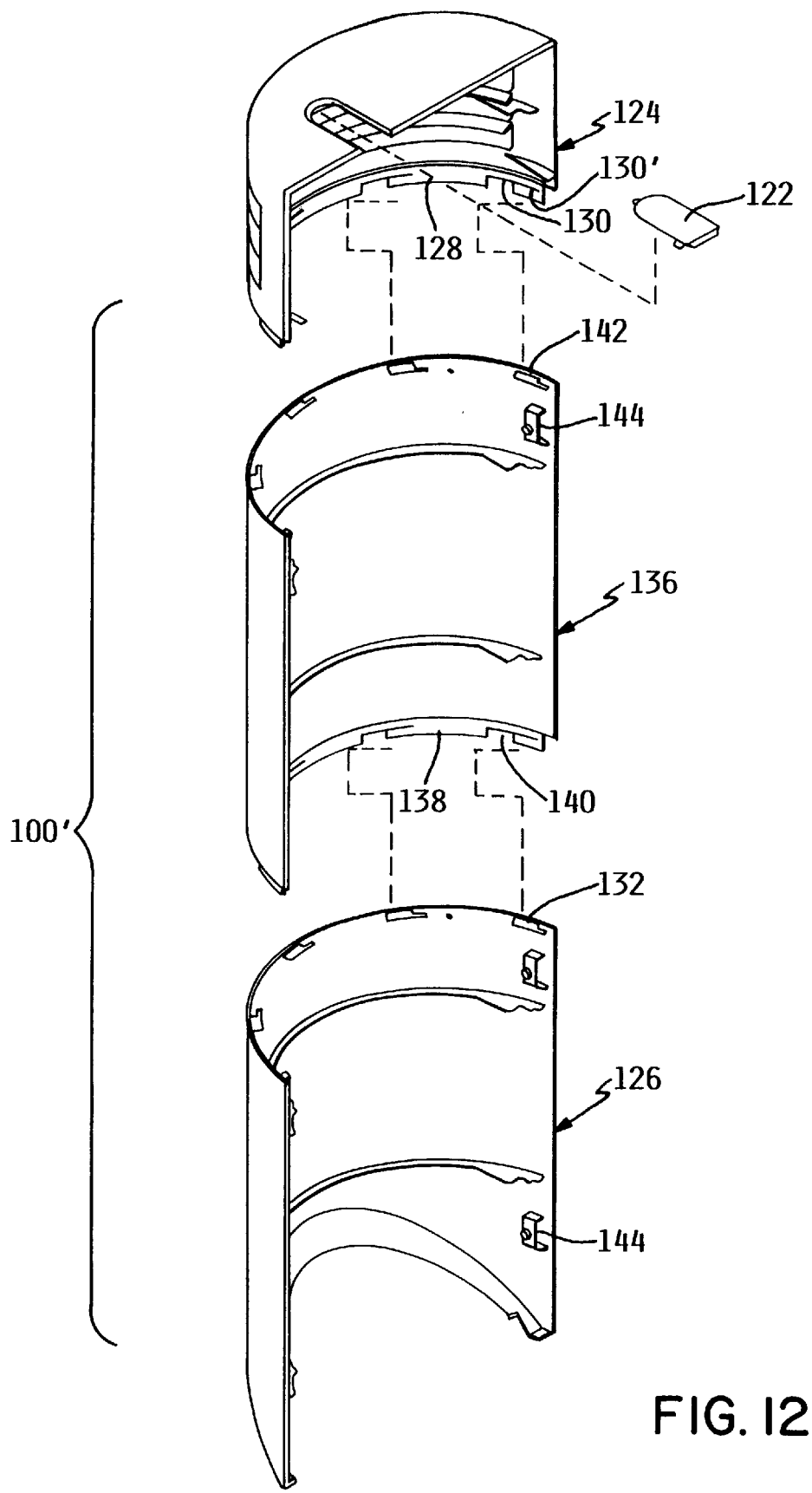
FIG. 12 is an exploded perspective view of the rear cover segment shown in FIGS. 10 and 11, illustrating the sub-components of the rear cover section, according to an exemplary embodiment of the invention.
Figure 13:
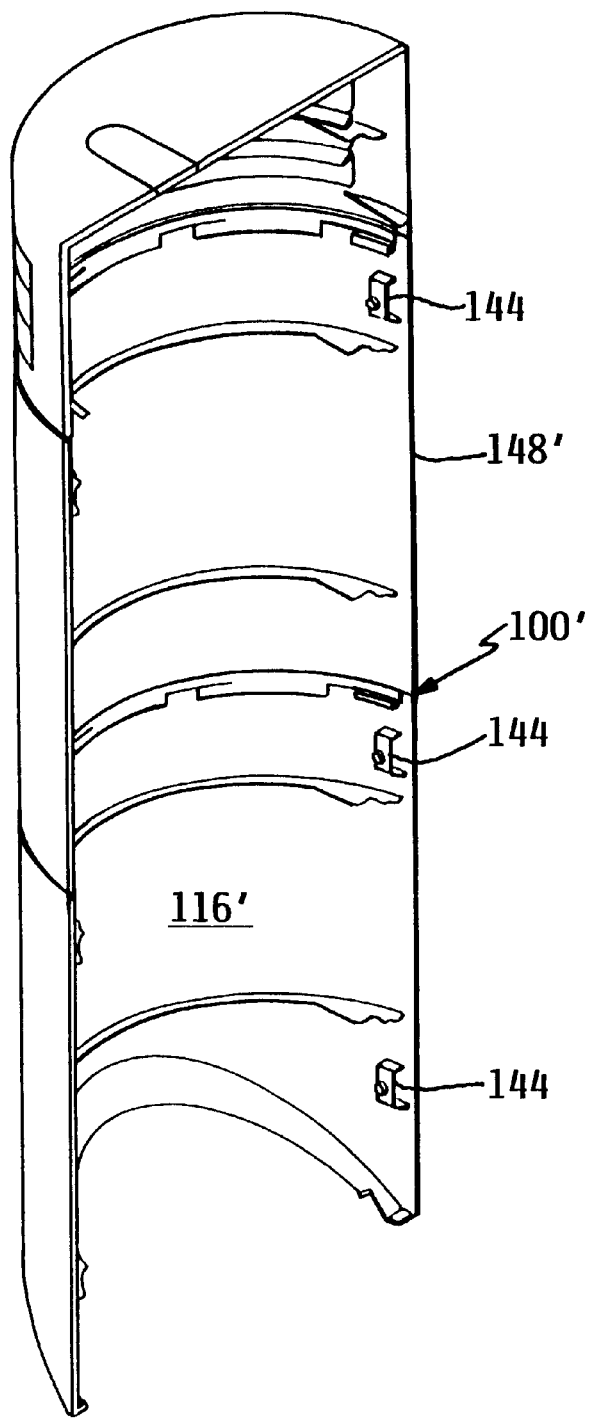
FIG. 13 is a perspective illustration of the rear cover segment shown in FIG. 12, with the sub-components positioned together.

As shown in FIGS. 12 and 13, the intermediate section 136 has a halftubular shape, similar to the bottom section 126. Further, the intermediate section 136 includes a downwardly projecting flange 138 along its bottom edge, similar to the downwardly projecting flange 128 of the top section 124. The downwardly projecting flange 138 of the intermediate section 136 is arced-shaped, and includes one or more recesses 140 therein, for engagement with the engagement fingers 132 of the bottom section 126. Further, the top edge of the intermediate section 136 includes a one or more engagement fingers 142 projecting out from the inner surface of the intermediate section 136, similar to the engagement fingers 132 of the bottom section 126. Each engagement finger 142 of the intermediate section 136 is engageable with a respective recess 130 of the top section 124. Once all of the respective engagement fingers 132, 142 are engaged with all of the respective recesses 130, 140, the top section 124, intermediate section 136 and bottom section 126 will be secured together to form the elongated rear cover section 100'. Although the engagement fingers 132, 142 and recesses 130, 140 have been described as being located on specific edges of the respective sections of the rear cover section 100, 100', other placements are also possible within the spirit of the invention.

As shown, one or more of the sections 124, 126, 136 of the rear cover section 100, 100' may be provided with connectors 144 which engage with corresponding slots 146 (FIG. 10) formed along the edges of the rear side 16 of the modular enclosure 12. The connectors 144 may project out from the inside surface 116, 116' of the rear cover section 100, 100' and be arranged along opposite, longitudinally extending edges 148, 148' of the rear cover section 100, 100' (i.e., the linear edges). Preferably, the slots 146 formed along the edges of the rear side 16 of the modular enclosure 12 slant downwardly, so that when the rear cover section 100, 100' is installed, the weight of the rear cover section prevents the connectors 144 from disengaging from the respective slots 146.

As will be appreciated, by configuring the rear cover section 100, 100' into a plurality of modular sections, the same top and bottom sections 124, 126 can be used regardless of the height of the rear cover section 100, 100'. This reduces the number of rear cover components necessary to cover a rear of the various housing arrangements.

Figure 14:
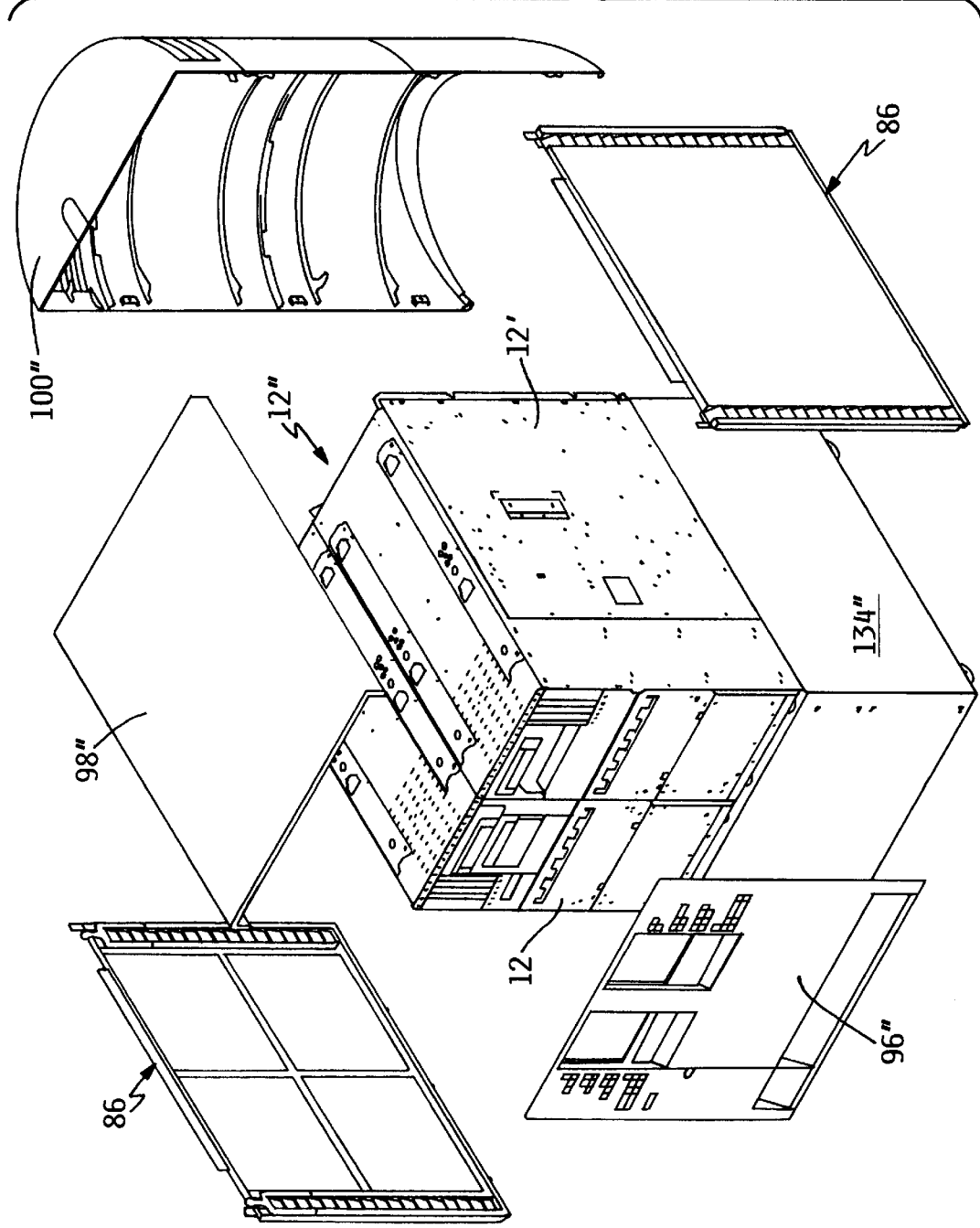
FIG. 14 is a perspective, exploded view of two of the enclosure shown in FIGS. 1 and 2 connected together and arranged on top of a double-wide pedestal, together with an alternative exemplary embodiment of the rear cover section, top cover section, and front cover section.

As mentioned above, two or more of the modular enclosures 12, 12' can be located side-by-side and attached together to form the larger modular enclosure 12". As shown in FIG. 14, the side panels 86 may still be used to cover the exposed major sides 14 of the modular enclosure 12". However, since the resulting modular enclosure 12" is now twice as wide as one modular enclosure 12, 12', the top cover section 98", front cover section 96" and rear cover section 100" will likewise be provided with a width which corresponds to a width of the resulting modular enclosure 12". However, all other aspects of the top cover section 98", front cover section 96" and rear cover section 100" can remain the same. For example, the double wide rear cover section 100" can still be comprised of a plurality of sub-components, which are interconnected together in the manner previously described.

Figure 15:
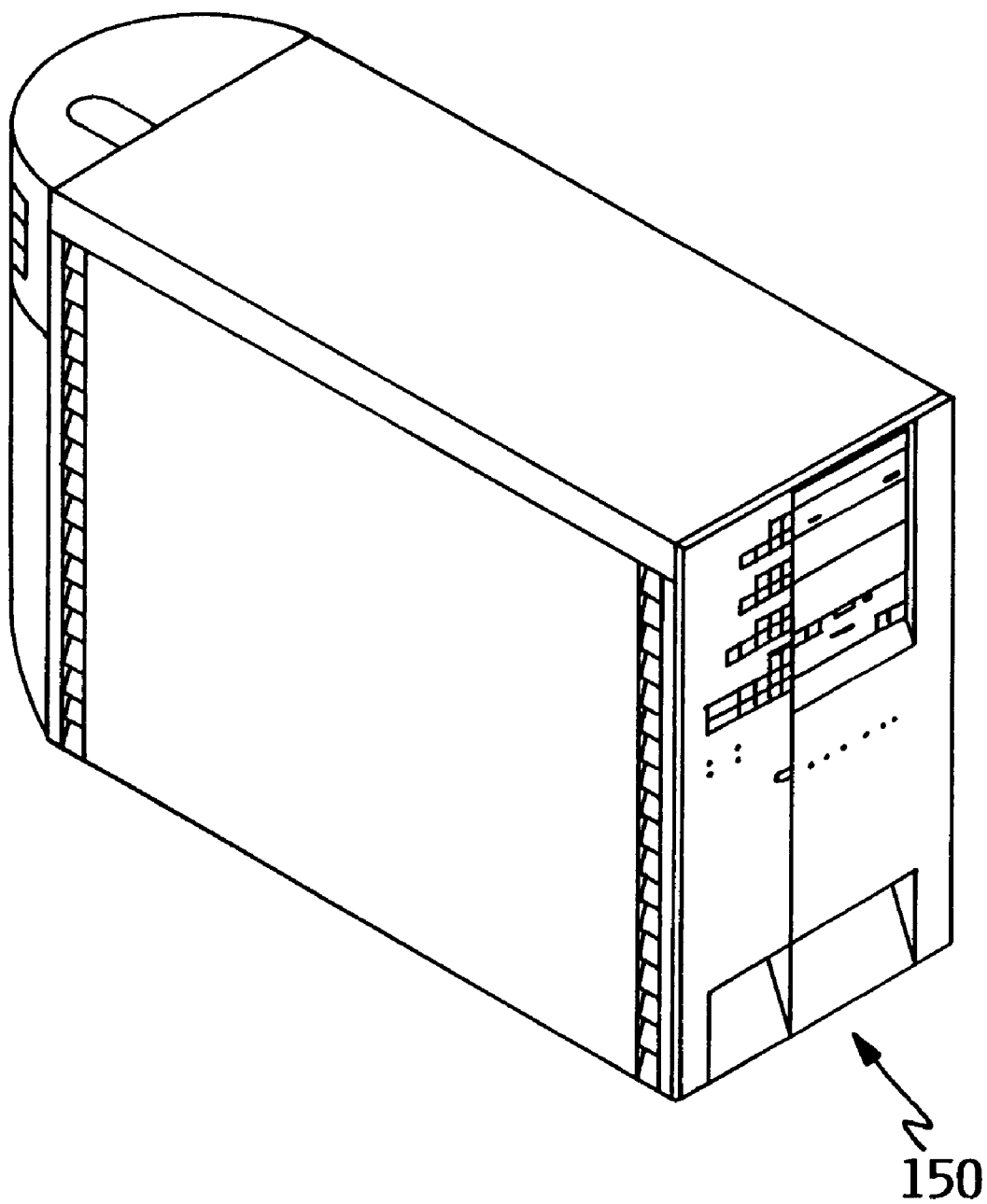
FIG. 15 is a perspective illustration of a modular cabinet having one enclosure, according to an exemplary embodiment of the invention.
Figure 16:
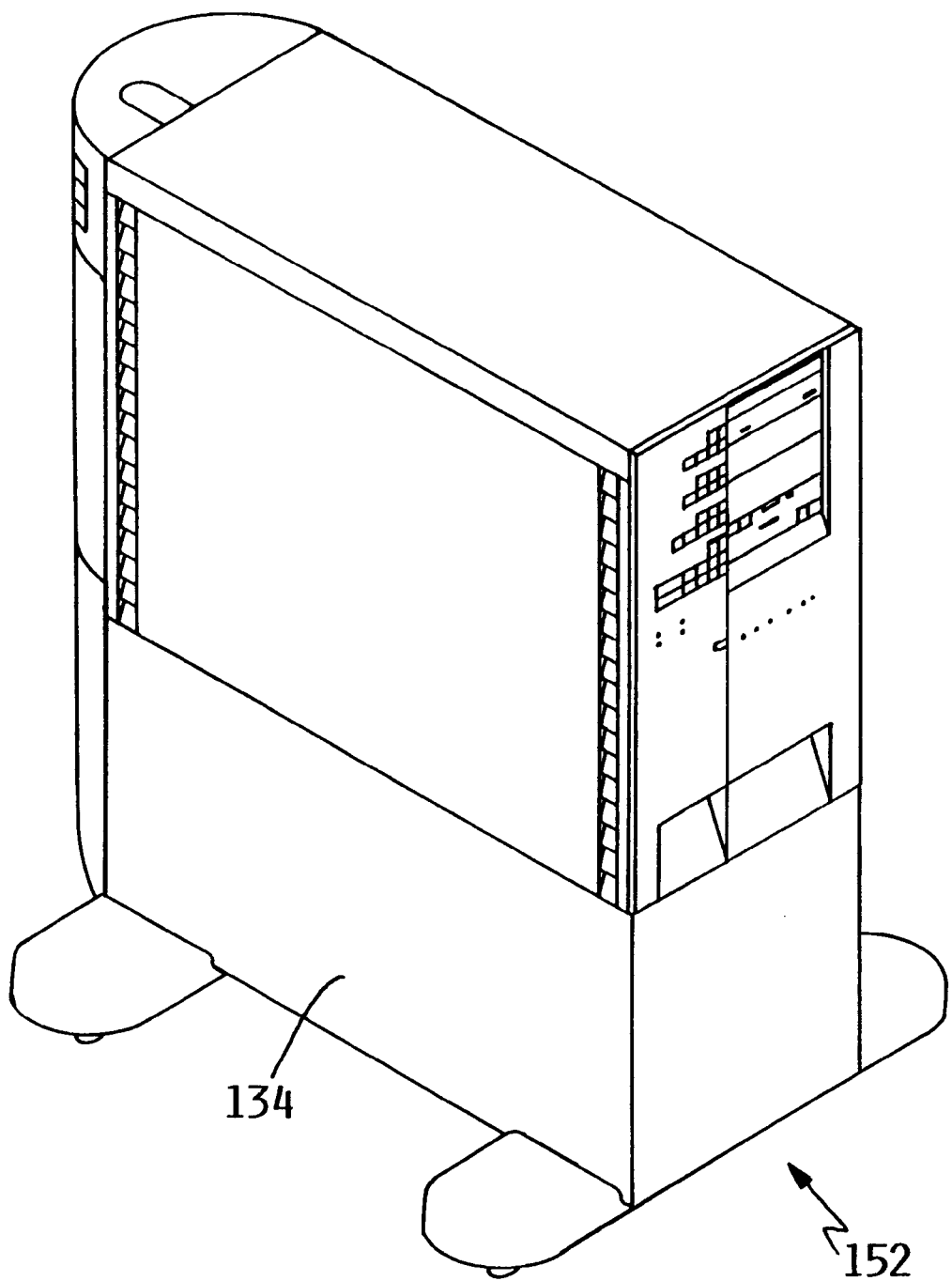
FIG. 16 is a perspective illustration of a modular cabinet having one enclosure arranged on top of a pedestal, according to an exemplary embodiment of the invention.
Figure 17:
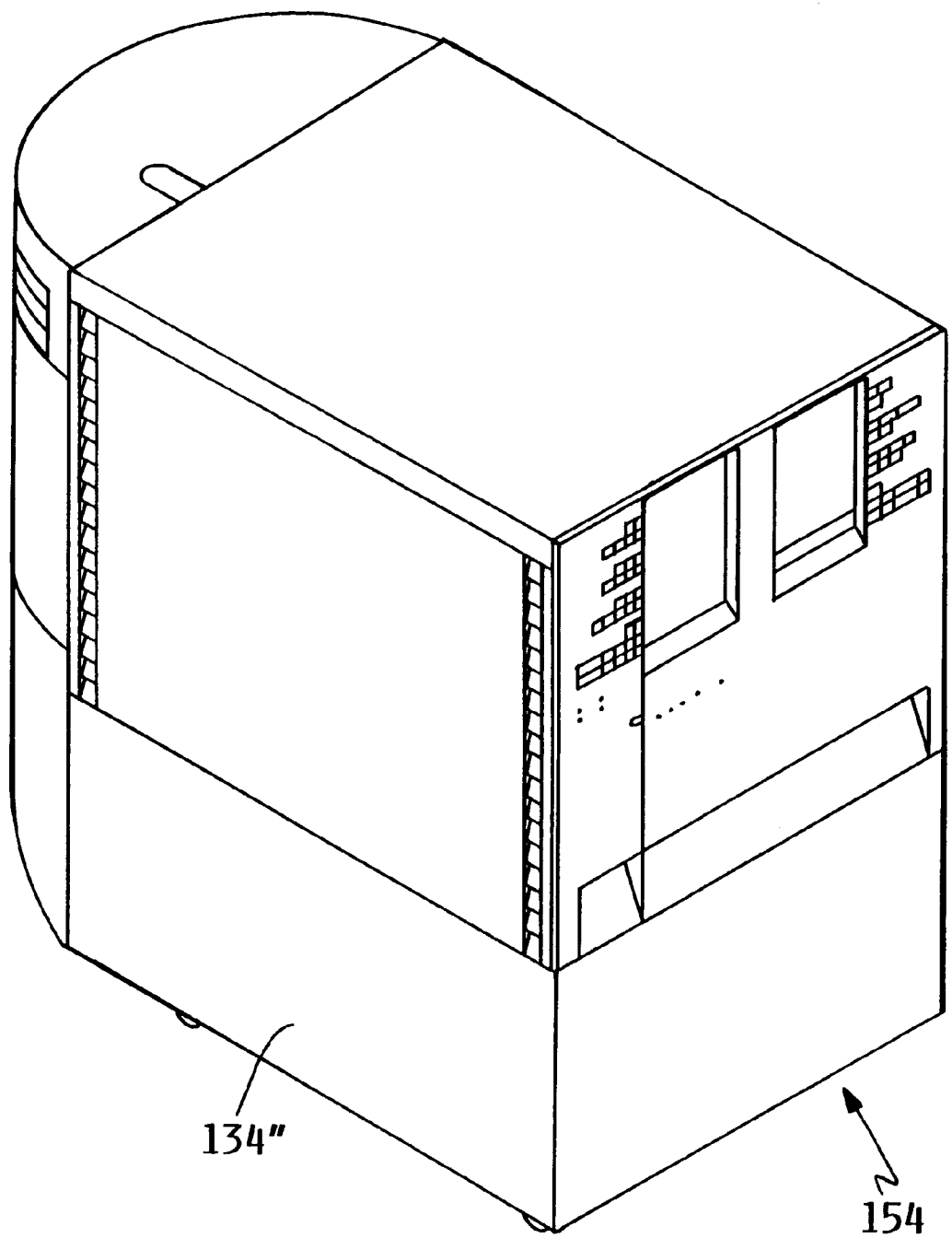
FIG. 17 is a perspective illustration of a modular cabinet having two enclosures arranged on top of a double wide pedestal, according to an exemplary embodiment of the invention.

FIGS. 15–17 show three different exemplary embodiments of the modular cabinet, with all of the cover sections installed. FIG. 15 shows a modular cabinet 150 having one modular enclosure, which is hidden from view by the cover. FIG. 16 shows a modular cabinet 152 having one modular enclosure stacked on top of pedestal 134, with the modular enclosure being hidden from view by the cover. FIG. 17 shows a modular cabinet 154 having a plurality of modular enclosures connected side-by-side and stacked on a double wide pedestal 134", with the modular enclosures being hidden from view by the cover. Other arrangements of the modular enclosures are also possible within the spirit of the invention.

It should be understood, however, that the invention is not necessarily limited to the specific arrangement and components shown and described above, but may be susceptible to numerous variations within the scope of the invention.

It will be apparent to one skilled in the art that the manner of making and using the claimed invention has been adequately disclosed in the above-written description of the preferred embodiments taken together with the drawings.

It will be understood that the above description of the preferred embodiments of the present invention is susceptible to various modifications, changes, and adaptations, and the same are intended to be comprehended within the meaning and range of equivalents of the appended claims.

What is claimed is:

1. An electronics cabinet, comprising:
   at least one modular enclosure selectively connectable to at least one of a further, substantially identical modular enclosure, and a pedestal enclosure, and
   at least one cover, comprising at least a first modular section and a second modular section, said first modular section and said second modular section being stackable and connectable together and being positionable over a side of said modular enclosure to substantially cover the side, wherein one of said first modular section and said second modular section has a flange located on an edge thereof, said flange having at least one recess and at least one slot formed therein, with the slot being in communication with the recess, and the other of said first modular section and said second modular section has at least one engagement finger projecting out from an inner surface thereof, said engagement finger being receivable within the slot via the recess to hold said first modular section and said second modular section together in an edge-to-edge relationship.

2. The electronics cabinet of claim 1, wherein said at least one modular enclosure comprises a plurality of substantially identical modular enclosures connected together.

3. The electronics cabinet of claim 1, wherein said at least one modular enclosure has a side locatable against and connectable to a corresponding side of the further, substantially identical modular enclosure to form a larger modular enclosure.

4. The electronics cabinet of claim 1, wherein said at least one modular enclosure has a generally parallelepiped shape, and is comprised of two parallel major sides, and a top, base, front and rear side arranged perpendicular to said major sides.

5. The electronics cabinet of claim 4, wherein said two parallel major sides, and said top, base, front and rear side collectively define at least one space located within said at least one modular enclosure for the placement of selected components.

6. The electronics cabinet of claim 5, wherein said major sides each have at least one respective opening allowing access to the space.

7. The electronics cabinet of claim 6, wherein said at least one modular enclosure comprises a plurality of substantially identical modular enclosures connected together and arranged with a respective major side of each enclosure disposed adjacent to a respective major side of another enclosure, with the respective openings of the adjacent major sides being in registration.

8. The electronics cabinet of claim 6, further comprising an enclosure panel fastenable to said enclosure and positionable over at least one of the respective openings to prevent access to the space through the opening.

9. The electronics cabinet of claim 5, further comprising at least one structural member attached to said enclosure; wherein the at least one space is defined by said structural member into at least one small space located in a front region of said enclosure, and at least one large space located adjacent to said at least one small space and in a rear region of said enclosure.

10. The electronics cabinet of claim 9, wherein said at least one structural member comprises at least one shelf connected to an inner surface of said major sides and extending from the front side of said enclosure to the large space, said at least one shelf defining the at least one small space into a plurality of stacked small spaces, each being accessible through the front side of said enclosure, and being separated from each other by said shelf.

11. The electronics cabinet of claim 10, further comprising at least one cage positionable within a respective space, and being adapted to receive a selected component.

12. The electronics cabinet of claim 11, wherein said cage comprises one of a processor book cage, a processor card cage, a power supply cage, a peripheral component interconnect cage, a tape unit cage, and a direct access storage device cage.

13. The electronics cabinet of claim 1, wherein said first modular section and said second modular section form a rear cover section positionable over a rear side of said modular enclosure to essentially hide the rear side of said modular enclosure from view, said first modular section and said second modular section being connectable together in a plurality of different configurations to form a plurality of different cover configurations.

14. The electronics cabinet of claim 13, wherein said flange extends essentially in a horizontal direction.

15. The electronics cabinet of claim 13, wherein said rear cover section has a half-tubular shape to separate with a space an inner surface of said rear cover section away from the rear side of said enclosure.

16. A cover, comprising:
at least a first modular cover section and a second modular cover section stackable and fastenable directly together at respective outer peripheral edges thereof and in a plurality of different configurations to form a plurality of different cover configurations, with said first modular cover section and said second modular cover section being oriented in a same general manner when connected together so that each cover configuration has a general appearance of an enlarged version of at least one of said first modular cover section and said second modular cover section, wherein the outer edge of one of said first modular cover section and said second modular cover section has an essentially horizontally extending flange, said flange having at least one recess, and at least one slot formed therein, with the slot being in communication with the recess, and the other of said first modular cover section and said second modular cover section has at least one engagement finger projecting out from an inner surface thereof, said engagement finger being receivable within the slot via the recess to hold said first modular cover section and said second modular cover section together.

17. The cover of claim 16, wherein the slot extends in a direction substantially parallel to the edge, and wherein, when said engagement finger is fully received within the slot, said engagement finger engages with said flange so that movement of said first modular cover section relative to said second modular cover section is prevented in a direction perpendicular to the edge.

18. The cover of claim 16, wherein, when said engagement finger is fully received within the slot, said flange overlaps the edge of the other of said first modular cover section and said second modular cover section so as to be positioned superposed to the inner surface thereof.

19. The cover of claim 18, wherein said first modular cover section and said second modular cover section have an appearance of a single cover when said engagement finger is fully received within the slot.

20. The cover of claim 16, wherein at least one of said first modular cover section and said second modular cover section is provided with at least one rib on an inner surface thereof, said rib having opposing ends that form positioning stops that abut against an item to be covered.

21. The electronics cabinet of claim 1, wherein the slot extends in a direction substantially parallel to the edge, and wherein, when said engagement finger is fully received within the slot, said engagement finger engages with said flange so that movement of said first modular section relative to said second modular section is prevented in a direction perpendicular to the edge.

22. The electronics cabinet of claim 1, wherein, when said engagement finger is fully received within the slot, said flange overlaps an edge of the other of said first modular section and said second modular section so as to be positioned superposed to the inner surface thereof.

23. The electronics cabinet of claim 22, wherein said first modular section and said second modular section have an appearance of a single cover when said engagement finger is fully received within the slot.

24. The electronics cabinet of claim 1, wherein an edge of said modular enclosure has a downwardly-extending slot formed therein, and wherein at least one of said first modular section and said second modular section has a connector that projects out from the inner surface thereof, said connector being received within the downwardly-extending slot so as to connect said at least one cover to said modular enclosure.

25. An electronics cabinet, comprising:
at least one modular enclosure connectable to at least one of a further, substantially identical modular enclosure, and a pedestal enclosure, said at least one modular enclosure having a generally parallelepiped shape, and being comprised of:
two parallel major sides, each having at least one respective opening therein;
a top side, base side, front side and rear side arranged perpendicular to said major sides, with said sides collectively defining at least one large space located in a rear interior region of said enclosure and being accessible through the openings in said major sides; and
at least one shelf connected to an inner surface of said major sides and extending from the front side of said enclosure to the large space, said shelf defining a plurality of stacked small spaces located in a front interior region of said enclosure and adjacent to said large space, each small space being accessible through the front side of said enclosure, and being separated from each other by said shelf, said spaces being for the placement of selected components;
a cover panel positionable over at least one of the respective openings in said major sides to restrict access to the large space through the covered opening;
a cage positionable within a respective space, and being adapted to receive a selected component, wherein said cage comprises one of a processor book cage, a processor card cage, a power supply cage, a peripheral component interconnect cage, a tape unit cage, and a direct access storage device cage; and a cover positionable over at least one of said major sides, said top side, said front side, and said rear side of said enclosure, said cover comprising at least a first modular section and a second modular section, said first modular section and said second modular section being stackable and connectable together and being positionable over a respective side of said modular enclosure to substantially cover the respective side, wherein one of said first modular section and said second modular section has a flange located on an edge thereof, said flange having at least one recess, and at least one slot formed therein, with the slot being in communication with the recess, and the other of said first modular section and said second modular section has at least one engagement finger projecting out from an inner surface thereof, said engagement finger being receivable within the slot via the recess to hold said first modular section and said second modular section together in an edge-to-edge relationship.

26. An electronics cabinet, comprising:
at least one modular enclosure selectively connectable to at least one of a further, substantially identical modular enclosure, and a pedestal enclosure
a rear cover section, comprising at least a first modular section and a second modular section, said first modular section and said second modular section being stackable and connectable together in a plurality of different configurations to form a plurality of different cover configurations, said rear cover section being positionable over a rear side of said modular enclosure to essentially hide the rear side of said modular enclosure from view, wherein one of said first modular section and said second modular section has an essentially horizontally extending flange with at least one recess therein, and the other of said first modular section and said second modular section has at least one engagement finger projecting out from an inner surface thereof, said engagement finger being engageable with said recess to hold said first modular section and said second modular section together.

\* \* \* \* \*